UNITED STATES PATENT OFFICE.

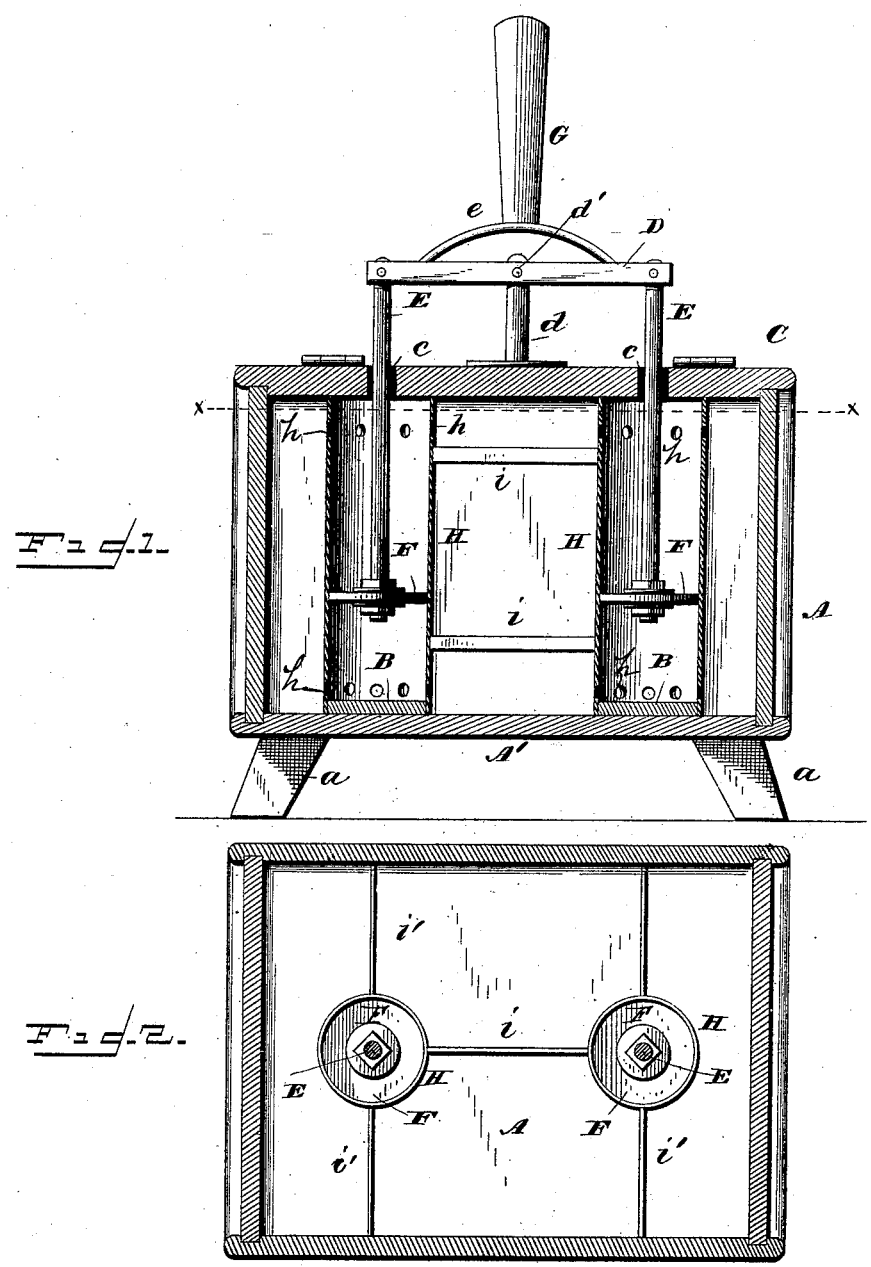

ROBERT G. PING, OF AUDUBON, IOWA, ASSIGNOR OF ONE-HALF TO JOHN BALLMANN, OF SAME PLACE.

CHURN.

SPECIFICATION forming part of Letters Patent No. 357,027, dated February 1, 1887.

Application filed June 3, 1886. Serial No. 204,075. (No model.)

*To all whom it may concern:*

Be it known that I, ROBERT G. PING, a citizen of the United States of America, residing at Audubon, in the county of Audubon and State of Iowa, have invented certain new and useful Improvements in Churns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in churns; and it consists in the construction and combination of the parts, as will be hereinafter fully set forth, and specifically pointed out in the claims.

In the accompanying drawings, which illustrate my invention, Figure 1 is a sectional view of a churn embodying my improvements, and Fig. 2 is a horizontal section taken through the line $x\ x$ of Fig. 1.

A refers to the body of the churn, which is mounted on suitable supports or legs, $a\ a$. This churn-body preferably consists of a rectangular structure having vertical sides, and a bottom, A', to which bottom are rigidly secured circular blocks B B.

C refers to the top, which may be made in two sections, one of said sections being hinged to the other. The top is provided centrally with an upwardly-projecting standard, $d$, which is rigidly secured thereto, and is provided with a perforation, through which passes a bolt, $d'$, for attaching the bar D to the same. The ends of the bar D have pivotally attached thereto, in suitable recesses, depending rods E E, said rods being provided at their lower ends with packings F, as will be hereinafter set forth. The oscillating cross-bar D has rigidly secured thereto a curved bar, $e$, to the center of which is attached the operating-handle G.

H H refer to sheet-metal cylinders, which are provided near their upper and lower ends with a series of perforations, $h\ h$, and these cylinders are of such a length that they will bear upon the top and bottom of the churn when they are placed in position, the bases of said cylinders being placed over the circular blocks B, so as to hold them securely in position. The top or cover C of the churn-body is provided with openings $c$, through which the bars or piston-rods E pass.

The cylinders H H are braced to each other by bars $i\ i$, and they are also provided with bars $i'$, which will bear against the vertical sides of the churn-body, so as to hold the cylinders in place. It will be noted that one of the bars $i$, and the bar $i'$ are located near the upper edge of the cylinders, so as to bear against the upper portion of the churn-body.

The cream to be churned is placed in the churn-body and the handle G oscillated so as to cause the pistons F to reciprocate within the cylinders. This movement causes the cream to alternately enter and be discharged from the cylinders through the openings $h$ in the lower portion thereof, which will agitate the cream so as to convert the same into butter very rapidly. At each upward and downward stroke of the pistons a certain amount of air will be drawn into the churn-body by the downward movement of one of the pistons, and a similar amount forced out by the opposite movement. Thus by reciprocating the pistons the cream is not only agitated, but a circulation of pure air within the churn-body is also provided.

By means of the brace-bars and blocks the cylinders are held firmly in a vertical position, and they can be readily removed from the churn-body by raising the same.

The device hereinbefore described is simple, and is not provided with any valves or pipes wherein the cream may accumulate and sour, and the parts are easily accessible for cleansing.

I am aware that prior to my invention churns have been constructed as shown in patents numbered 108,631, dated October 25, 1870, and 7,870, dated January 1, 1851, and I do not therefore claim what is shown or described in said patents.

I claim—

1. The combination, with a churn-body provided with blocks B B, rigidly secured thereto, of a top having a cross-bar, D, with an operating handle pivotally secured thereto, said top being provided with openings $c$, reciprocating bars E, secured to the cross-bar and provided with pistons F, cylinders H H, having perforations h h, and brace-rods i and i', the parts being organized substantially as shown, and for the purpose set forth.

2. In a churn, a body having blocks B B attached thereto, a top with openings c c, through which pass piston-rods E E, having tight pistons F F, in combination with the removable cylinders H H, the ends thereof having perforations h h, and brace-rods i i, connecting the pistons to each other and extending therefrom so as to contact with the sides of the churn-body, the parts being organized so that when the pistons are reciprocated the cylinders will be alternately filled and a current of air drawn into and discharged from the churn-body, substantially as set forth.

In testimony whereof I affix my signature in presence of two witnesses.

ROBERT G. PING.

Witnesses:
CHARLES BAGLEY,
H. W. HANNA.